United States Patent Office 3,542,809
Patented Nov. 24, 1970

3,542,809
SYNTHESIS OF ARYLCHLOROCARBONYL KETENES
Susumu Nakanishi, Niantic, Conn., assignor to Pfizer Inc., a corporation of Delaware
No Drawing. Filed Oct. 23, 1968, Ser. No. 770,098
Int. Cl. C07c 63/14; C07d 31/34, 63/12
U.S. Cl. 260—332.2                   7 Claims

ABSTRACT OF THE DISCLOSURE

An improved process for making arylchlorocarbonyl ketenes which comprises reacting an arylmalonic acid with thionyl chloride in at least a 1:2 molar ratio at a temperature of from about 70°–180° C.

BACKGROUND OF THE INVENTION

This invention relates to an improvement in the process for making arylchlorocarbonyl ketenes, such as phenylchlorocarbonyl ketene, by the reaction of an arylmalonic acid with a halogenating agent, which comprises reacting an arylmalonic acid with thionyl chloride in at least a 1:2 molar ratio in a reaction-inert solvent at a temperature of from about 70°–180° C.

The production of ketenes from malonic acid derivatives is described in the literature. Staudinger, Helv. Chim. Acta 8, 306 (1925), for example, prepared a series of low-molecular-weight dialkyl ketenes by the thermal decomposition of di(lower)alkyl substituted malonic anhydrides. In a modification of this method, using mixed anhydrides prepared from disubstituted malonic acids and diphenyl ketene, Staudinger et al., ibid 6, 291 (1923) and Ber. 46, 3539 (1913), prepared various disubstituted ketenes by thermal decomposition. A still further method comprises the dehalogenation of α-halo acyl halides with zinc, Staudinger, Ann. 356, 71 (1907); 380, 298 (1911). By extension of this reaction, Staudinger et al., Ber. 42, 4908 (1909), prepared ethyl carbethoxy ketene by the dehalogenation of diethyl-α-bromo-α-ethyl malonate. Another method, the decomposition of diazo ketenes, has been used to prepare certain diaryl ketenes, Smith et al., Org. Syntheses 20, 47 (1940); Gilman et al., Rec. trav. chim. 48, 464 (1929). It is further known that certain disubstituted acetyl chlorides undergo dehydrohalogenation under the influence of tertiary amines to form keto ketenes. This method, however, appears to be limited to the preparation of certain aryl and high-molecular-weight keto ketenes, all of which are relatively resistant to dimerization, Staudinger et al., Ber. 41, 594 (1908).

The reaction of phenylmalonic acid with phosphorus pentachloride (1:2 molar ratio) in ether solution is reported by Sorm et al., Coll. Czech. Chem. Communs. 20, 593–6 (1955), to produce phenylmalonyl chloride. The same authors report (loc. cit.) that when the reaction is conducted in the absence of a solvent at the reflux temperature phenylchloromalonyl chloride is produced. Both products are isolated by vacuum distillation.

The reaction of arylmalonic acids with a halogenating agent selected from the group consisting of phosphorus pentachloride, phosphorus trichloride, phosphorus oxychloride, and thionyl chloride at temperatures of from about 0°–50° C., followed by thermal decomposition of the resulting dihalide to provide arylchlorocarbonyl ketenes, is described in the co-pending application of K. Butler, U.S. Ser. No. 695,851, filed Jan. 5, 1968.

SUMMARY OF THE INVENTION

It has now been found, quite surprisingly and unexpectedly, that arylchlorocarbonyl ketenes can be easily prepared in good yield by an improvement of the process described in U.S. Ser. No. 695,851. The improvement comprises reacting an arylmalonic acid having the formula

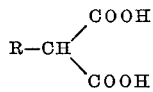

wherein
R, broadly referred to herein as an aryl group, is selected from the group consisting of thienyl, furyl, pyridyl, phenyl, and substituted phenyl wherein the substituent is selected from the group consisting of chloro, bromo, (lower)alkyl, (lower)alkoxy, di-(lower)alkylamino, and trifluoromethyl with thionyl chloride in at least a 1:2 molar ratio and at a temperature of from about 70° C. to about 180° C.

The improved process of this invention is most surprising and unexpected in view of the teaching of Butler (loc. cit.) that the reaction be conducted at temperatures ranging from about 0° C. to about 50° C. using stoichiometric proportions of arylmalonic acid:halogenating agent in the presence of a reaction-inert solvent. The substantial improvements in yield afforded by the improved process of this invention, relative to the abovementioned disclosure, is most unexpected. Additionally, the present process affords consistent yields of high-quality product.

DETAILED DESCRIPTION OF THE INVENTION

The improved process of this invention for making arylchlorocarbonyl ketenes comprises the reaction of an arylmalonic acid with thionyl chloride in at least a 1:2 molar ratio at temperatures ranging from about 70° C. to about 180° C. The reaction is preferably conducted in the presence of a reaction-inert gas; that is, a gas which does not react with the reactants or products, such as nitrogen, helium, carbon dioxide, air, to permit rapid removal of the by-products, hydrogen chloride and sulfur dioxide, and to decrease the reaction time. As an alternative to the use of a stream of inert gas, the reaction can, of course, as will be recognized by those skilled in the art, be conducted under slightly reduced pressure. The use of an inert gas, however, is preferred.

The reaction is conducted in the presence of a reaction-inert solvent such as toluene or xylene. Other solvents which can be used are dipropyl ether, dimethyl ethers of ethylene glycol and propylene glycol, benzene, and carbon tetrachloride.

For optimum yields of arylchlorocarbonyl ketene, the molar ratio of arylmalonic acid to thionyl chloride should be at least 1:2. A 1:1 molar ratio can, of course, be used but is not favored since it is productive of reduced yields. The preferred molar proportions of reactants are from 1:1 to 1:4. Molar ratios greater than 1:4 can, of course, be used. A large excess of thionyl chloride can, of course, be employed as both reactant and solvent but is not productive of optimum yields.

In order to achieve optimum yields, the reaction is conducted at a temperature sufficient to keep the thionyl chloride at reflux. While temperatures ranging from 70°–180° C. are operative, the preferred temperature range is from 80°–140° C. Temperatures below 70° C. result in reduced yields of the desired arylchlorocarbonyl ketene due to incomplete reaction and require longer reaction periods. Temperatures greater than 180° C. also tend to result in reduced yields, usually as a result of dimerization of the ketene product.

The reaction time, of course, depends principally upon the reaction temperature. In general, the reaction is allowed to proceed until removal of the by-product hydrogen chloride is essentially complete. The use of elevated temperatures and the passage of a stream of inert gas over or through the reaction mixture or the conduct of the reaction under slightly reduced pressure expedite completion of the reaction.

The use of thionyl chloride as a halogenating agent has the advantage over other halogenating agents such as phosphorus pentachloride and phosphorus trichloride of forming only volatile by-products. This, of course, greatly facilitates recovery of the arylchlorocarbonyl ketenes. It also permits the recovery of a crude reaction mixture which can be used as such, without the need for purifying the arylchlorocarbonyl ketene, by the simple expedient of removing any unreacted thionyl chloride present by simple distillation or evaporation. The arylchlorocarbonyl ketene products are conveniently purified by distillation under reduced pressure. The distillation of arylchlorocarbonyl ketenes produced by this improved process surprisingly occurs with no release of hydrogen chloride during the distillation. This is in direct contrast to the distillation of arylchlorocarbonyl ketenes produced by the use of phosphorus pentachloride or phosphorus trichloride as halogenating agent. These latter agents render it difficult to control the distillation because of the release of hydrogen chloride during distillation possibly arising from the presence of halogenating agent or by-product which decomposes the ketene product and/or continued halogenation of the arylmalonic acid still present as a result of incomplete reaction.

The yields of arylchlorocarbonyl ketenes produced by this improved process are substantially greater and of improved quality than those obtained when using the other halogenating agents mentioned above. Phenylchlorocarbonyl ketene, when produced by the improved process of this invention, is obtained in yields of up to 95% compared to a 68% yield obtained when using phosphorus pentachloride as halogenating agent.

The arylchlorocarbonyl ketenes produced by the improved process of this invention are useful as intermediates for the production of arylcarboxy ketene esters by reaction with alcohols. The esters, in turn, are useful as acylating agents and are highly valuable for the production of esters of α-carboxy arylacetyl derivatives of 6-aminopenicillanic acid which are useful antibiotics per se. These esters can, in turn, be hydrolyzed to the corresponding valuable antibiotic compounds, α-carboxy arylacetyl derivatives of 6-aminopenicillanic acid, by procedures such as are disclosed in British Pat. 1,004,670.

The following examples are provided to illustrate this invention but not in any way to limit its scope.

EXAMPLE I

Phenylchlorocarbonyl ketene (A) By the process of this invention, a three-neck flask, equipped with a condenser, dropping funnel, thermometer, stirrer, and gas inlet, is charged with phenylmalonic acid (1 mole) and toluene (250 ml.) and the mixture cooled to 0° C. Thionyl chloride (3 moles) is added dropwise over a 15-minute period to the well-stirred mixture and the mixture heated at reflux under a slow stream of nitrogen for 18.5 hours. (The reflux temperature gradually rose from 77° C. to 124° C. during this period.) The excess thionyl chloride and most of the toluene are then removed under reduced pressure at a temperature below 35° C. The residue is then distilled in vacuo to give 170.5 (94.7% yield) of product, B.P. 95°–102° C. at 1.75 mm. The product solidifies upon cooling to 0° C.

(B) By means of phosphorus pentachloride, to a stirred solution of phosphorus pentachloride (46 g.) in ethyl ether (100 ml.), there is added phenylmalonic acid (10 g.) over a two-minute period. The mixture is stirred at room temperature for four hours, then refluxed for four hours, and allowed to stand overnight at room temperature. The excess phosphorus pentachloride is filtered off and the ether boiled off at atmospheric pressure. The reaction mixture gradually progresses in color from dark yellow to red. The residue is distilled in vacuo to give the product: B.P. 83°–86° C. at 1.5 mm. as a yellow liquid; yield=68%.

EXAMPLE II

Phenylchlorocarbonyl ketene

The procedure of Example I is repeated but using the reaction conditions listed below. The yield in each case (except where noted) is comparable to that of Example I.

| PMA [a] (moles) | SOCl$_2$ (moles) | Solvent (volume in ml.) | T., °C. | Inert gas |
|---|---|---|---|---|
| 1 | 2 | Toluene—(500) | 77–120 | N$_2$. |
| 1 | 2.2 | Toluene—(250) | Reflux | N$_2$. |
| 1 | 4 | ____do____ | do | N$_2$. |
| 1 | 10 | Toluene—(500) | do | N$_2$. |
| 1 | 3 | Toluene—(250) | do | |
| 1 | 3 | Xylene—(300) | do | He. |
| 1 | 10 | Xylene—(500) | do | N$_2$. |
| 1 | 4 | Diglyme [b]—(250) | 77–180 | |
| 1 | 22 | CCl$_4$—(500) | Reflux | CO$_2$. |
| 1 | 3 | Toluene—(250) | do | Air. |
| 1 | 4 | Toluene—(500) | do | (c). |
| 1 | 2 | Benzene—(300) | do | N$_2$. |

[a] PMA=Phenylmalonic acid.
[b] Diglyme=Dimethyl ether of ethylene glycol.
[c] Conducted at slightly reduced pressure using the aspirator.

EXAMPLE III

Following the procedure of Example I, the arylchlorocarbonyl ketenes listed below are prepared from the appropriate arylmalonic acid.

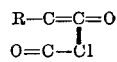

R:

2-thienyl
3-thienyl
2-pyridyl
3-pyridyl
4-pyridyl
2-furyl
3-furyl
o-butoxyphenyl
o-butylphenyl
o-diethylaminophenyl
p-di-(n-propyl)aminophenyl
o-dibutylaminophenyl
m-dimethylaminophenyl
m-ethoxyphenyl
m-chlorophenyl

R:

o-tolyl
m-tolyl
p-tolyl
o-methoxyphenyl
p-methoxyphenyl
p-trifluoromethylphenyl
p-chlorophenyl
o-dimethylaminophenyl
p-dimethylaminophenyl
m-methoxyphenyl
m-trifluoromethylphenyl
o-isopropylphenyl
o-chlorophenyl
o-bromophenyl
m-bromophenyl

EXAMPLE IV

Methyl ester of phenylcarboxy ketene

To a solution of phenylchlorocarbonyl ketene (0.5 g.) in methylene chloride (5 ml.), there is added anhydrous methanol (0.1 ml.) at room temperature. Hydrogen chloride is liberated. The mixture, maintained under an atmosphere of nitrogen, is stirred for 20 minutes and the product recovered by evaporation of the solvent.

In like manner, the methyl and phenyl esters of the products of Examples II and III are prepared.

EXAMPLE V

α-Carbobenzyloxy arylmethylpenicillins

To a solution of the appropriate arylchlorocarbonyl ketene (0.1 mole) in methylene chloride (sufficient to provide a clear solution and generally from about 5 to 10 ml. per gram of ketene), there is added benzyl alcohol (0.1 mole). The reaction mixture is maintained at 5°–10° C. under an atmosphere of nitrogen and stirred for one hour, care being taken to exclude moisture. A solution of 6-aminopenicillanic acid-triethylamine salt (0.1 mole) in methylene chloride (50 ml.) is added and the mixture stirred at −50° C. for ten minutes. The cooling bath is then removed and the reaction mixture stirred continuously and allowed to warm to room temperature.

The reaction mixture is evaporated to dryness under reduced pressure, the residue taken up in citrate buffer (pH 5.5), and the product extracted from the buffer solution with chloroform. The chloroform extract is washed with citrate buffer (pH 5.5), then dried with anhydrous sodium sulfate, and evaporated to dryness to give the sodium salt of the product.

The benzyl esters are converted to the corresponding α-carboxy arylmethylpenicillins by catalytic hydrogenation as follows:

The ester product (0.025 mole) in water (200 ml.) is added to a prehydrogenated suspension of 10% palladium on charcoal in water (50 ml.). The mixture is hydrogenated at room temperature and pressure until absorption of hydrogen is complete. The catalyst is then removed by filtration, the filtrate covered with ether (150 ml.), stirred, and adjusted to pH 2. The ether layer is separated and the aqueous phase extracted with more ether (3×50 ml.). The combined ether extracts are washed with water (20 ml.) and extracted with sufficient sodium bicarbonate solution (10%) to give an aqueous solution of pH 7. Evaporation of the aqueous solution affords the α-carboxy arylmethylpenicillin as the disodium salt.

PREPARATION A

Malonic acids

The following arylmalonic acids not previously described in the literature are prepared by the method of Wallingford et al., J. Am. Chem. Soc. 63, 2056–2059 (1964), which comprises condensing an alkyl carbonate, usually diethyl carbonate, with an equimolar proportion of the desired ethyl aryl acetate in the presence of an excess (4–8 times) of sodium ethylate with continuous removal of by-product alcohol from the reaction mixture. The esters thus produced are hydrolyzed to the acid by known methods.

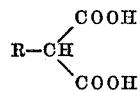

R:
- o-methoxyphenyl
- m-methoxyphenyl
- p-methoxyphenyl
- o-trifluoromethylphenyl [1]
- m-trifluoromethylphenyl
- p-trifluoromethylphenyl
- o-isopropylphenyl
- 3-furyl R:
- 3-pyridyl
- 4-pyridyl
- o-butoxyphenyl
- o-dimethylaminophenyl
- o-diethylaminophenyl
- m-dimethylaminophenyl
- p-dimethylaminophenyl

[1] The necessary o-trifluorophenylacetic acid is prepared from o-trifluorobenzoonitrile by the procedure of Corse et al., J. Am. Chem. Soc. 70, 2841 (1948), which comprises:
  (a) conversion of the nitrile to o-trifluoromethylacetophenone by a Grignard reaction with methylmagnesium iodide followed by hydrolysis:
  (b) reaction by the acetophenone with sulfur and morpholine at 135° C. for 16 hours followed by treatment with glacial acetic acid and hydrochloric acid.

What is claimed is:

1. In the process for making arylchlorocarbonyl ketenes of the formula

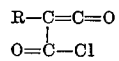

by reaction of an arylmalonic acid with a halogenating agent, the improvement which comprises reacting an arylmalonic acid of the formula

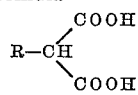

wherein
R is selected from the group consisting of thienyl, furyl, pyridyl, phenyl, and substituted phenyl wherein the substituent is selected from the group consisting of chloro, bromo, (lower)alkyl, (lower)alkoxy, di-(lower)alkylamino, and trifluoromethyl,
with thionyl chloride in at least a 1:2 molar ration in a reaction-inert solvent at 70°–180° C. and recovering the arylchlorocarbonyl ketene.

2. The process of claim 1 wherein the reaction-inert solvent is toluene.

3. The process of claim 2 wherein the reaction is conducted at the reflux temperature.

4. The process of claim 3 wherein the reaction is conducted in the presence of a stream of a reaction-inert gas.

5. The process of claim 3 wherein the molar ratio of arylmalonic acid to thionyl chloride is from about 1:2 to about 1:4.

6. The process of claim 5 wherein R is phenyl.

7. The process of claim 5 wherein R is 3-thienyl.

References Cited

UNITED STATES PATENTS 3,408,348  10/1968  Martin et al. _____ 260—243

HENRY R. JILES, Primary Examiner

CECILIA M. SHURKO, Assistant Examiner

U.S. Cl. X.R.

260—239.1, 295, 347.3, 476, 515, 518, 521, 544, 592, 999

UNITED STATES PATENT OFFICE
CERTIFICATE OF CORRECTION

Patent No. 3,542,809          Dated November 24, 1970

Inventor(s) Susumu Nakanishi

It is certified that error appears in the above-identified patent and that said Letters Patent are hereby corrected as shown below:

Column 4, line 7, cancel "(except where noted)"; line 30, the formula should appear as shown below:

$$\begin{array}{c} R-C=C=O \\ | \\ O=C-Cl \end{array}$$

Column 6, line 14, "o-trifluorophenylacetic" should read -- o-trifluoromethylphenylacetic --; line 15, "o-trifluorobenzoonitrile" should read -- o-trifluoromethylbenzonitrile --; lin 18, "reaction by the" should read -- reaction of the --; line 39, "ration" should read -- ratio --.

Signed and sealed this 25th day of May 1971.

(SEAL)
Attest:

EDWARD M. FLETCHER, JR.           WILLIAM E. SCHUYLER, JR.
Attesting Officer                 Commissioner of Patents